United States Patent [19]

Ficke et al.

[11] 4,419,304
[45] Dec. 6, 1983

[54] METHOD FOR FORMING SEALS WITH HEAT SHRINKABLE MATERIALS

[75] Inventors: William H. Ficke, Gwinnett; Robert N. McIntyre, DeKalb, both of Ga.

[73] Assignee: Western Electric Company, Inc., New York, N.Y.

[21] Appl. No.: 169,058

[22] Filed: Jul. 15, 1980

[51] Int. Cl.³ .................... B29C 27/02; B29D 9/00
[52] U.S. Cl. ........................ 264/25; 264/230; 264/248
[58] Field of Search ............... 264/249, 25, 230, 248; 156/85–87, 69, 272; 174/DIG. 8, 74 A, 74 R; 428/86

[56] References Cited

U.S. PATENT DOCUMENTS

| | | | |
|---|---|---|---|
| 2,553,259 | 5/1951 | Hagedorn | 156/69 |
| 2,715,363 | 8/1955 | Hoover | 264/25 |
| 3,243,211 | 3/1966 | Wetmore | 403/28 |
| 3,379,218 | 4/1968 | Conde | 138/99 |
| 3,396,455 | 8/1968 | Sherlock | 228/153 |
| 3,396,460 | 8/1968 | Wetmore | 264/230 |
| 3,455,336 | 7/1969 | Ellis | 138/156 |
| 3,484,577 | 12/1969 | Foreman | 219/85 R |
| 3,691,505 | 12/1972 | Graves | 338/214 |
| 3,846,205 | 11/1974 | Yazawa | 156/308.2 |
| 3,851,296 | 11/1974 | Muchmore et al. | 339/60 M |
| 3,899,807 | 8/1975 | Sovish et al. | 24/255 R |
| 3,908,267 | 9/1975 | Lloyd et al. | 29/631 |
| 3,950,604 | 4/1976 | Penneck | 174/68 A |
| 4,070,044 | 1/1978 | Carrow | 285/156 |
| 4,079,104 | 3/1978 | Dickson et al. | 264/25 |
| 4,147,291 | 4/1979 | Akao et al. | 428/516 |
| 4,163,117 | 7/1979 | Campbell et al. | 428/86 |
| 4,251,304 | 2/1981 | Campbell et al. | 156/85 |

FOREIGN PATENT DOCUMENTS

| | | | |
|---|---|---|---|
| 699406 | 12/1964 | Canada | 428/218 |
| 6609658 | 3/1972 | Fed. Rep. of Germany | . |
| 1587915 | 4/1970 | France | 156/69 |
| 878993 | 10/1961 | United Kingdom | 174/DIG. 8 |
| 979833 | 1/1965 | United Kingdom | 174/DIG. 8 |
| 1053651 | 1/1967 | United Kingdom | . |
| 1562186 | 3/1980 | United Kingdom | . |

Primary Examiner—Willard E. Hoag
Attorney, Agent, or Firm—David P. Kelley

[57] ABSTRACT

A sealing method and article of manufacture is disclosed wherein a heat-shrinkable sleeve having a partial transmittance to radiation is shrunk and fused to a plastic substrate by the application of radiant heat.

10 Claims, 3 Drawing Figures

1

METHOD FOR FORMING SEALS WITH HEAT SHRINKABLE MATERIALS

TECHNICAL FIELD

This invention relates generally to heat shrinkable materials and to methods of bonding heat shrinkable sleeves to plastic substrates.

BACKGROUND OF THE INVENTION

Heat shrinkable materials today enjoy widespread industrial usage. These articles are characterized by their ability to shrink upon being heated. Comprised of polymers, they are first fabricated in their desired final size and shape and then crosslinked as by the use of high energy radiation or chemical crosslinking techniques. Subsequent heating of the material melts the crystals or significantly lessens other internal molecular forces to an extent sufficient to allow distortion above the melt of the product. Quenching of the heated and distorted crosslinked material results in a product which is in its distorted shape while at room temperature. Reheating of the product sufficiently to melt the crystals or reduce intermolecular forces allows the crystalline material quickly to return the product to its initial crosslinked size and shape. Methods of manufacturing these articles are exemplified in U.S. Pat. Nos. 2,027,962 and 3,086,242.

Heat shrinkable materials have heretofore been used in the telecommunications industry in the form of end caps having a tubular sleeve portion formed unitarily with an end wall portion that is bonded about the ends of cables. For example, it is often desirable to mount an end cap temporarily about the end of a communications cable to prevent loss of internal cable pressurization and internal flooding compound to ambience and to inhibit ambient air and moisture from entering the cable. In this application the end cap sleeve portions are formed of heat shrinkable materials of an expanded size having an inside diameter greater than the outside diameter of the cable whereby they may be easily placed over the end of the cable and then shrunk tightly down upon the cable by the application of heat. Cable end seals effected by these end caps have, however, often proved to be insecure and leaky allowing pressurization to be lost and moisture to enter the cable core over a period of time. Upon examination it has been revealed that the reason for this has typically been an incomplete fusion of the heat shrinkable plastic end cap to the plastic jacket of the cable. In other words, even though the end cap has been shrunk tightly upon the substrate, fusion of the two plastic materials at their interfacing surfaces has been less than that sufficient to produce a sound and hermetically reliable seal.

Hot melt adhesive coatings have also been applied to the surface of the jacket to aid in bonding the end cap to the jacket upon shrinkage. Although this approach has produced more reliable seals they are achievable only at a substantial increase in costs. Furthermore, in some cases, as where the substrate has a size discontinuity or step, it has proven difficult to maintain such heat shrinkable end caps or sleeves in proper positions during seal formations since the outer member often tends to "walk off" the inner member where an adhesive coating is present.

Thus, it is desirable to achieve a sound hermetic seal between a heat shrinkable end cap or sleeve and substrate without the use of fusible inserts or adhesive coatings and by the very mechanism of heat application used in drawing the end cap or sleeve down upon the substrate. One method of achieving this is disclosed in U.S. Pat. No. 3,691,505 with the use of a laminate tube or sleeve having a non-fusible heat shrinkable outer layer and an inner fusible layer, the outer layer having a relatively higher melting point than the inner layer. By applying hot air the tube may be shrunk down upon a semi-vulcanized butyl rubber tape covering a heater cable and the laminate inner layer fused to the tape. Though this approach does avoid the use of an adhesive per se it remains analogous in that a multi-layered heat shrinkable tube or sleeve is still employed with its attendant costs.

Accordingly, there still remains a need for hermetic seals between heat shrinkable sleeves and plastic substrates which overcome the problems and limitations experienced with those of the prior art. It is to this task which the present invention is primarily directed.

SUMMARY OF THE INVENTION

In one preferred form of the invention a method of hermetically sealing a sleeve about a plastic substrate is provided which comprises the steps of mounting a heat shrinkable plastic sleeve having a transmittance of at least 50% to electromagnetic radiation within a selected wavelength band about the plastic substrate, and applying electromagnetic radiation within the selected wavelength band to the sleeve for a period of time sufficient to cause the sleeve to shrink upon the substrate and for the interfacing surfaces of the substrate and sleeve to fuse.

In another form of the invention a method is provided for hermetically sealing a plastic sleeve about a plastic substrate. The method comprises the steps of mounting about the plastic substrate a heat-shrinkable plastic sleeve having a crystalline melting point substantially equal to or less than the crystalline melting point of the plastic substrate and with the sleeve being partially transparent to electromagnetic radiation within a selected wavelength band, and applying electromagnetic radiation within said selected wavelength band to the sleeve for a period of time sufficient to cause the sleeve to shrink upon the substrate and for the interfacing surfaces of the substrate and sleeve to fuse.

In another preferred form of the invention an article of manufacture is provided which comprises an elongated plastic substrate about which a heat shrinkable plastic sleeve having a transmittance of at least 50% to radiation is heat shrunk and fused by the application of radiant heat.

In yet another form of the invention an article of manufacture is provided comprising a plastic substrate about which a heat-shrinkable plastic sleeve having a crystalline melting point substantially equal to or less than the crystalline melting point of the plastic substrate and a partial transmittance to radiation is shrunk and fused to the substrate by the application of radiant heat.

BRIEF DESCRIPTION OF THE DRAWING

FIG. 2A is a cross-sectional view of a fragment of a heat shrinkable sleeve positioned about the plastic jacket of the cable shown in FIG. 1 preparatory to being shrunk thereupon while

DETAILED DESCRIPTION

Figure 1:
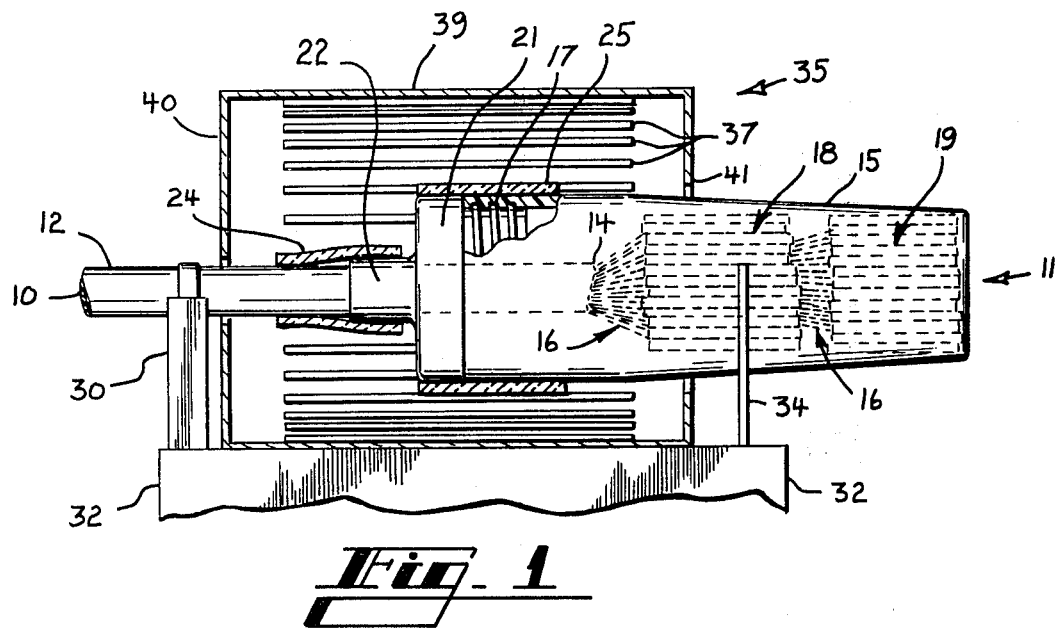
FIG. 1 is a side view, in cross-section, of an end cap being sealed to the end of a preconnectorized telecommunications cable in accordance with the present invention.

Referring now in more detail to the drawing, there is shown in FIG. 1 a telecommunications cable 10 of conventional structure having a low or medium density polyethylene insulated jacket 12 composed principally of polyethylene and vinyl acetate with carbon black additive. The cable jacket is terminated at 14 within a high density high molecular weight polyethylene cable end cap 11. The end cap is comprised of a body section 15 screwed to a reducer section 21 by threads 17. A plurality of insulated communication wires shown generally at 16 and forming the cable core extend outwardly from the jacket termination 14 within the end cap to a plurality of connectors positioned within the end cap as two connector banks 18 and 19. The end cap reducer section 21, which is positioned on the cable prior to cable connectorization, has a tubular neck or sleeve portion 22 fitted closely about the cable jacket 12. A heat shrinkable plastic sleeve 24, having a transmittance of at least 50% to electromagnetic radiation within a selected wavelength band, is placed about the portion of the cable jacket 12 that emerges from the reducer neck section 22 and also overlaying an adjacent portion of the reducer section neck portion itself. Similarly, another heat shrinkable plastic sleeve 25 having the same transmittance is placed about the juncture of the end cap body section 15 and reducer section 21 once the body has been screwed tightly onto the reducer section.

With continued reference to FIG. 1 the cable is further seen to be supported upon a holder 30 extending upwardly from a stand 32 while the end cap body section 15 is supported upon another holder 34 that also extends upwardly from the stand 32. An infrared heater 35 is positioned atop the stand between the two supports about the end cap reducer section and a portion of the body section. The infrared heater has an annular array of quartz lamps 37 mounted with a split "clam shell" type heater housing 39. The heater housing end walls 40 and 41 have apertures sized to receive the cable end cap, respectively as well as other unshown cooling ports.

With the just described components assembled in position within the heater as shown the heater is energized for a period of time sufficient for the sleeve 24 to shrink down upon the cable jacket and reducer section neck and for their interfacing surfaces to fuse together. The sleeve 25 also shrinks down upon and fuses with the end cap body and reducer sections. The heater is then deenergized and the cable and end cap now hermetically sealed together removed from the heater. The cable may then be pressurized by conventional techniques.

Figure 2A:
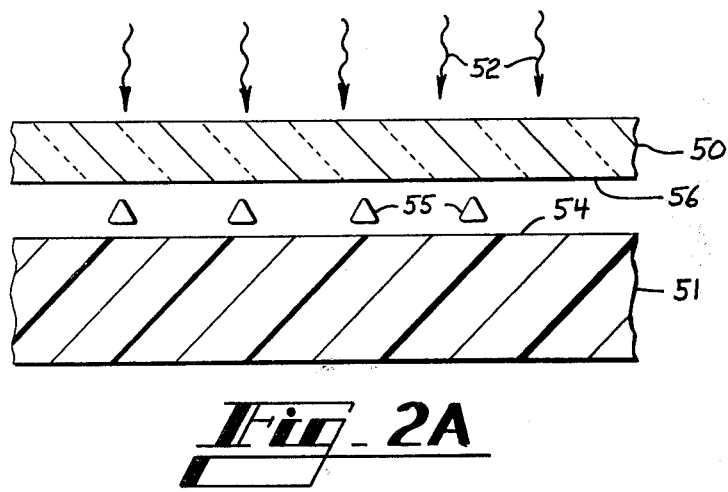
Figure 2B:
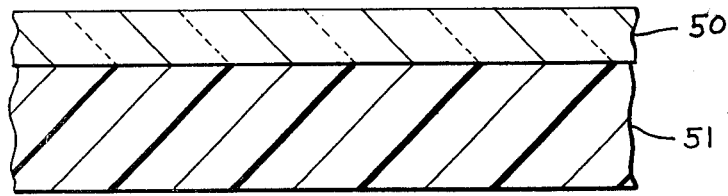
FIG. 2B illustrates the same combination of materials after shrinkage.

With reference next to FIGS. 2A and 2B the manner in which the hermetic seal is believed to be formed without the use of adhesive coatings or fusible inserts is explained in more detail. In FIG. 2A a heat shrinkable sleeve 50 having a transmittance of between 50 and 95% to radiation in the wavelength band of 0.5 to 5.0 microns and a density less than 0.95 gm/cm$^3$ is seen to be placed about and slightly from an underlying plastic substrate 51 having little if any transmittance within this band and a crystalline melting point substantially equal to or greater than that of the heat shrinkable sleeve. In actual practice the sleeve is ordinarily rested upon the substrate so that their upper portions are in mutual contact. As radiation is applied to the sleeve, as indicated by arrows 52, some of the radiation is transmitted completely through the sleeve and onto the substrate surface 54. As the surface 54 of the substrate has little if any transmittance to this radiation it is quickly heated as schematically indicated by heat symbols 55. At the same time another portion of the radiation is absorbed by and heats the sleeve itself whereby its temperature rises to its recovery temperature causing it to shrink down upon the substrate. As this occurs some heat may also be transmitted by convection from the heated surfaces 54 of the substrate to the surface 56 of the sleeve approaching the substrate. With the transmittance of the sleeve properly selected both the surfaces of the substrate and the adjacent surface of the sleeve reach their respective melting points. Whether or not this occurs just prior to that time at which the shrinking sleeve is brought into actual contact with the substrate is not positively known. In any event, however, the combination of actions occuring here causes the sleeve and substrate to fuse which may be actually observed through cooling ports in the heater housing.

A low density heat shrinkable tubular sleeve was hermetically sealed about a telecommunication cable jacket with the assembly comprised of the following materials.

| Cable Jacket | |
|---|---|
| a. Composition | ethylene plastic with vinyl and carbon black additive |
| b. Transmittance at 1.0 microns | 0% |
| c. Softening Point (Vicat Test) | 88° C. |
| d. Melting Point | 115° C. |
| e. Density | .934 gm/cm$^3$ |
| f. Gel Fraction | 0 |
| g. Crystallinity | 50% |
| h. Outside Diameter | 3 inches |
| Heat Shrinkable Sleeve | |
| a. Composition | ethylene plastic |
| b. Transmittance at 1.0 microns | 84% |
| c. Softening Point (Vicat Test) | 66° C. |
| d. Melting Point | 90° C. |
| e. Density | 0.919 gm/cm$^3$ |
| f. Gel Fraction | 0.63 |
| g. Inside Diameter in Expanded State | 4.4 inches |
| h. Outside Diameter in Expanded State | 4.5 inches |
| i. Recovery Temperature | 66° C. minimum |

The cable and sleeve loosely supported thereon were placed in a Model 4068 infrared heater manufactured by Research, Inc. of Minneapolis, Minn. having quartz type bulbs that emit infrared radiation in a wavelength band of from 0.5 to 5.0 microns. After the heater has been energized for 30 seconds the sleeve was observed through cooling ports in the heater housing to have shrunk into complete annular contact with the cable jacket. After 40 seconds fusion was observed to occur at the interfacing surfaces of the sleeve and substrate. Heating was continued for an additional 5 seconds and then terminated. The cable and sleeve were then removed from the heater, cooled to room temperature, pressurized to 15 psi and then subjected to sixty 12 hour temperature cycle between +140° F. and −40° F. No leaks were detected. The cable and sleeve were then subjected to ASTM peel test No. D-903. A peel or stripping strength of 12 lb/inch was then recorded. The modulus of the example sleeve was then determined to be 16 psi measured at 175° C. at 100% extension using 0.187 inches wide and 0.08 inches thick samples.

It thus is seen that a new method has been discovered for forming heremetic seals with heat shrinkable type materials. Good results have been obtained with sleeves of transmittance varying from between approximately 50 and 95% for the selected bandwidth. Where the transmittance is significantly less than 50% excessive heat is absorbed by the sleeves of low or medium density composition. Indeed, where the transmittance is quite low excessive burning occurs of sleeves of even high density plastic along with sufficient heating of the substrate. Conversely, where the transmittance is greater than 95% the substrate is excessively heated which can lead to deformation before full recovery. Ultraviolet stabilization is also poor for applications where such is a consideration with transmittance in excess of 95%. Good results have also been obtained with both tubular sleeves open at both ends and with sleeves of end cap shape which are closed at one end. That low or medium density heat shrink material is usable enhances its low temperature characteristic of not embrittling. Again, the melting point of the sleeve should not substantially exceed that of the substrate where deformation of the substrate or such sleeve brittleness at low temperatures is of concern.

It should be understood that the just described examples merely illustrate principles of the invention in preferred forms. Many modifications, deletions, and additions may, of course, be made thereto without departure from the spirit and scope of the invention in the following claims.

What is claimed is:

1. A method of hermetically sealing a sleeve about a plastic substrate which comprises the steps of:
    (a) mounting a heat-shrinkable plastic sleeve having a transmittance of between 50% and 95% to electromagnetic radiation within a selected infrared wavelength band about the plastic substrate; and
    (b) applying electromagnetic radiation within said selected wavelength band to the sleeve for a period of time sufficient to cause the sleeve to shrink upon the substrate and for the interfacing surfaces of the substrate and sleeve to fuse.

2. The sealing method of claim 1 wherein said heat-shrinkable plastic sleeve has a density less than 0.95 gm/cm$^3$.

3. The sealing method of claim 1 wherein said heat-shrinkable plastic sleeve has a melting point substantially equal to or less than the melting point of the plastic substrate.

4. The sealing method of claim 1 wherein step (b) radiation is applied to the sleeve for a period of time sufficient to cause mutual adjacent surfaces of the sleeve and substrate both to reach their respective melting point.

5. The sealing method of claim 1 wherein said substrate has no substantial transmittance of radiation within said wavelength band.

6. The sealing method of claim 1 wherein said substrate comprises ethylene plastic.

7. The sealing method of claim 1 wherein said selected wavelength band is from 0.50 to 5.00 microns.

8. A method of hermetically sealing a sleeve about a plastic substrate which comprises the steps of:
    (a) mounting about the plastic substrate a heat-shrinkable plastic sleeve having a crystalline melting point substantially equal to or less than the crystalline melting point of the plastic substrate with the sleeve being partially transparent to electromagnetic radiation within a selected infrared wavelength band; and
    (b) applying electromagnetic radiation within said selected wavelength band to the sleeve for a period of time sufficient to cause the sleeve to shrink upon the substrate and for the interfacing surfaces of the substrate and sleeve to fuse said transmittance being between 50% and 95% for radiation within the selected wavelength band.

9. The sealing method of claim 8 wherein said heat-shrinkable plastic sleeve has a density less than 0.95 gm/cm$^3$.

10. The sealing method of claim 9 wherein said heat shrinkable plastic sleeve has a transmittance of between 50 and 95%.

* * * * *